Sept. 3, 1957 H. J. HANSEN 2,805,089
PIPE COUPLING WITH WEDGED SPRING RING DETENT MEANS
Filed Dec. 30, 1954 4 Sheets-Sheet 1
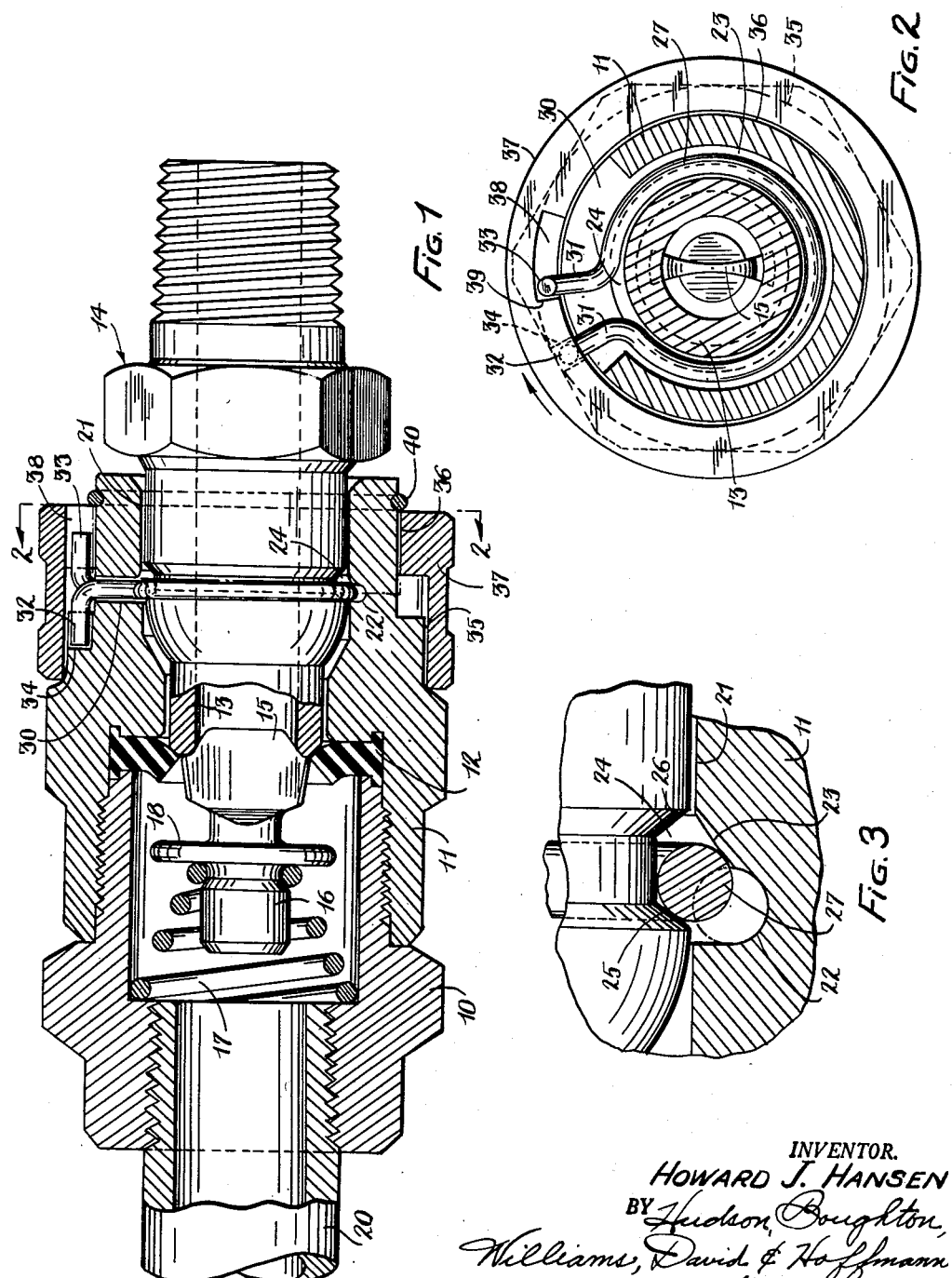
INVENTOR.
HOWARD J. HANSEN
BY Hudson, Boughton,
Williams, David & Hoffmann
ATTORNEYS

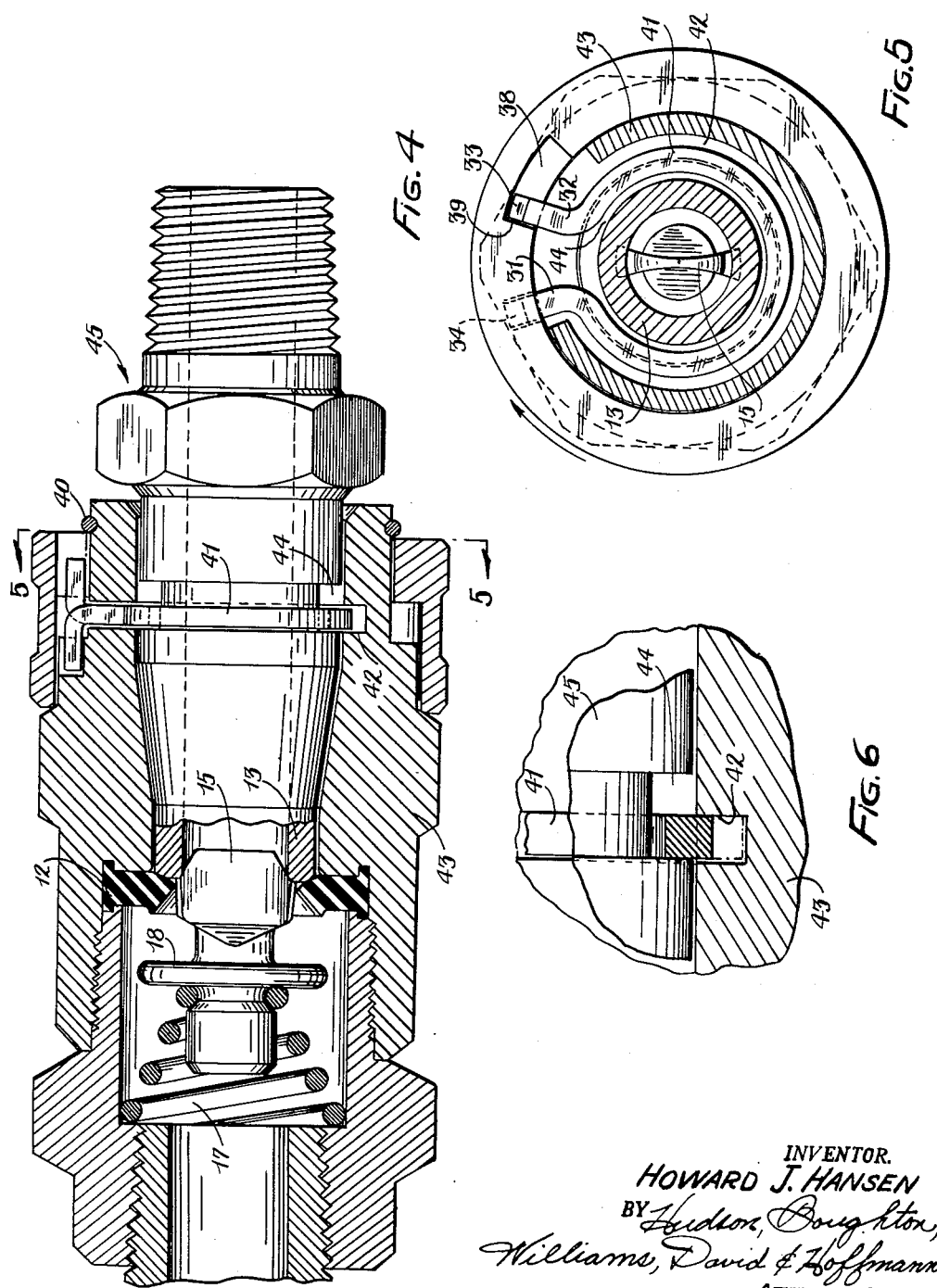

Sept. 3, 1957    H. J. HANSEN    2,805,089
PIPE COUPLING WITH WEDGED SPRING RING DETENT MEANS
Filed Dec. 30, 1954    4 Sheets-Sheet 3

INVENTOR.
HOWARD J. HANSEN
BY
ATTORNEYS

INVENTOR.
HOWARD J. HANSEN
ATTORNEYS

United States Patent Office 2,805,089
Patented Sept. 3, 1957

2,805,089

PIPE COUPLING WITH WEDGED SPRING RING DETENT MEANS

Howard J. Hansen, Bay Village, Ohio, assignor to The Hansen Manufacturing Company, Cleveland, Ohio, a corporation of Ohio Application December 30, 1954, Serial No. 478,838

3 Claims. (Cl. 285—317)

This invention relates to improvements in quick detachable couplings, particularly a coupling which embodies a valve that closes automatically when the coupling is broken. The invention comprises means for locking the two members of the coupling together, which means is not subject to accidental release as when the coupling is dragged over uneven terrain, but is readily releasable when desired or necessary.

The present application is a continuation-in-part of my copending application Serial No. 296,673, filed July 1, 1952, now abandoned.

One of the objects of the invention is the provision of a quick detachable coupling having positive locking means of a character such that it will not be released accidentally.

Another object is the provision of ring locking means which is concealed and therefore does not detract from the appearance of the coupling, and yet one which is readily operable to releasing position.

Another object is the provision of rotatable sleeve means for expanding the ring lock, whereupon the valve spring functions not only to close the valve but also to snap the male member out of operative position.

Other objects and features of novelty will appear as I proceed with the description of those embodiments of the invention which, for the purposes of the present application I have illustrated in the accompanying drawings, in which:

Fig. 1 is an elevational view partly in central longitudinal section of a coupling embodying the invention.

Fig. 2 is a cross-sectional view taken substantially on the line 2—2 of Fig. 1.

Fig. 3 is a fragmental detail view on a larger scale showing locked and released positions of a split ring employed in connection with the invention.

Fig. 4 is a view similar to Fig. 1 showing a modified form.

Fig. 5 is a transverse sectional view taken substantially on the line 5—5 of Fig. 4.

Fig. 6 is a large scale fragmental view of the locking ring of Figs. 5 and 6.

Figure 7:
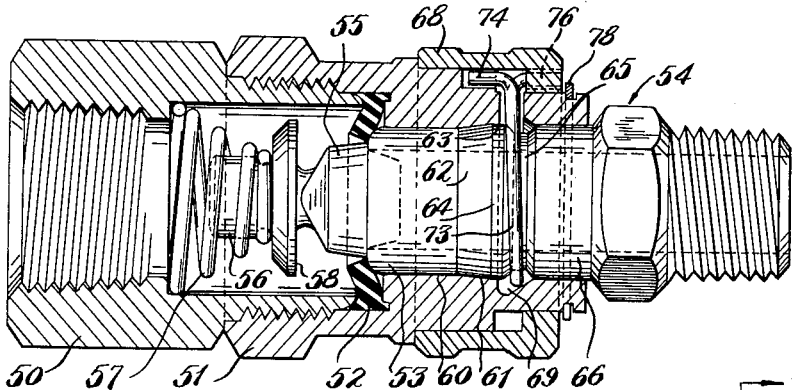
Fig. 7 is a view similar to Fig. 1 of a modified form of the invention.
Figure 8:
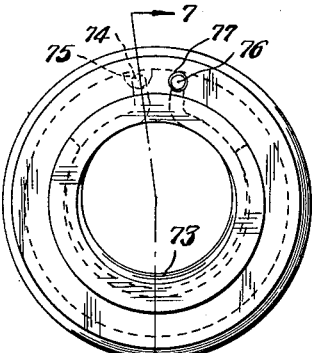
Fig. 8 is an end view of Fig. 7 with the plug or male member omitted.

Referring to Fig. 1, I have here shown a female member of a coupling comprising two castings 10 and 11 threadably connected together with an annular soft rubber gasket 12 gripped between them. When the coupling is in connected position, this gasket is engaged by the annular nose 13 of the male member of the coupling generally designated 14. The gasket is thus deformed somewhat and seals the joint between the two coupling members. With the parts in this position the annular nose 13 also engages a shoulder beyond a flattened extension 15 of a valve piece 16 and is thus held in a rearward position against the action of a strong coil spring 17. When the male member 14 is withdrawn the central deformed portion of gasket 12 resumes its natural form and the spring 17 forces valve piece 16 forward, the flattened extension 15 of the valve piece moving through the hole in the gasket and a valve disk 18 on valve piece 16 moving forward into position against the gasket, so that the side of the fluid line 20 terminating in the female part of the coupling is sealed.

The part 11 of the female member has a bore 21 in which is formed an internal groove comprising a portion 22 that is semicircular in cross-section and a portion 23 which is inclined. The male member 14 has an annular external groove 24 in which there are two inclined walls 25 and 26. These two grooves in the assembled condition of the coupling are substantially in register, as indicated in Figs. 1 and 3.

Member 11 carries a split ring of spring steel of circular cross-section. In the operative condition of the coupling and the unflexed condition of the ring 27 the latter is disposed partly in the internal groove 22, 23 and partly in the external groove 24. Thus the ring is disposed between the forward wall 25 of the groove in the male member and the forward inclined wall 23 of the female member, the term "forward" being understood to apply to the ends of the coupling members which approach each other when they are moved into engaging position. As will be apparent, especially from Fig. 3, any tendency for the coupling members to separate accidentally will be opposed by a camming action between the groove walls 25 and 23, forcing the ring 27 strongly inward and preventing its expansion into the portion 22 of the outer groove where it must go if the lock is to be released.

Female member 11 is provided with a slot 30 in the same plane with the portion 22 of the outer groove. The ends of the ring 27 have substantially radial portions 31 extending outwardly through this slot. From these radial portions there are terminal projections 32 and 33 disposed at right angles to the plane of the ring proper and parallel to the axis of the coupling. Projection 32 is anchored in the female member by extending into a notch 34 in that member.

The forward end of the female member has cylindrical external surfaces 35 and 36 upon which is mounted for partial rotation a sleeve 37 which conceals the ring ends 32 and 33. This sleeve has a cutout 38 which receives the ring projection 33 and provides a shoulder 39 for engagement therewith when the sleeve is turned in the direction of the arrow of Fig. 2. The sleeve is held against removal by a snap ring 40.

The sleeve 37 is provided with knurled surfaces on its periphery so that it may be conveniently grasped by an operator and turned to move ring end 33 away from ring end 32, thus expanding the ring and causing it to move out of groove 24 and into the portion 22 of groove 22, 23, in which position the male member is pushed out of engaging position by the spring 17.

The construction of Figs. 4, 5 and 6 is similar to that above described except that in this case the spring ring 41 is formed of wire of rectangular cross section. The internal groove 42 of the female member 43 is likewise rectangular in cross-section, as is also the external groove 44 of the male member 45.

In the modification of Figs. 7 to 15 inclusive the female member of the coupling comprises two castings 50 and 51 threadably connected together with an annular soft rubber gasket 52 gripped between them. This gasket is adapted to be engaged by the annular nose 53 of the plug or male member of the coupling, generally designated 54. The gasket seals the joint between the two coupling members and in addition functions as the seat for the automatic valve. With the members of the coupling assembled, as in Fig. 7, the annular nose 53 also engages a shoulder behind a flattened extension 55 of a valve piece 56, and it is thus held in a rearward position against the action of a strong spring 57. When the plug 54 is withdrawn the central deformed portion of gasket 52 resumes its natural form and the spring 57 forces valve piece 56 forward, the flattened extension 15 moving through the hole in the gasket, and a valve disk 58 on valve piece 56 moves forward into position against the gasket so that the side of the fluid line terminating in the female member of the coupling is sealed.

The part 51 of the female member has a bore 60 of a size to receive the nose 53 of the plug, an annular inclined part 61 to receive an outwardly beveled part 62 of the plug, and an annular bore 63 of slightly greater diameter. The plug in addition to the parts 53 and 62 has an annular land 64 of approximately the same diameter as the bore 63. It also has an annular groove 65 with two beveled side walls and a body part 66 fitting within the forward part of the bore 63.

The female member 51 has a reduced forward end that is normally covered by a sleeve 68. In this forward end there is a groove 69 which has a radial wall 70 and an inclined beveled wall 71, see particularly Fig. 15. This groove 69 is open to the outside of member 51 at one point through a slot 72. A split spring ring 73 is inserted into the groove 69 through this slot. The ends of ring 73 are bent at right angles to the general plane of the ring and extend parallel to the axis of the coupling. One end 74 extends rearwardly and is mounted in a notch 75 in the female member 51, while the other end 76 extends forwardly and is mounted in a perforation 77 in sleeve 68. The end 74 is therefore anchored in the female member 51 and the end 76 is free to turn to a limited extent with sleeve 68. When the sleeve 68 has been pushed into position to cause its hole 77 to receive the ring end 76 it is held against axial movement by a snap ring 78.

Figure 9:
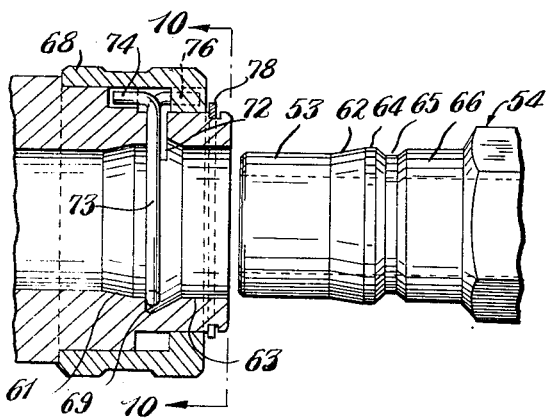
Fig. 9 is a fragmental sectional view with the two members of the coupling disconnected.
Figure 10:
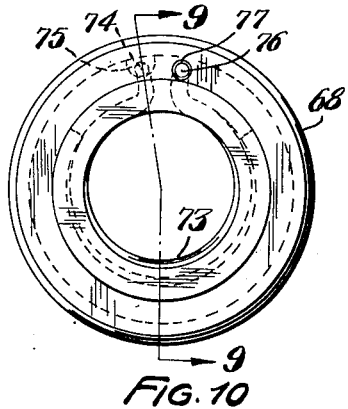
Fig. 10 is an end view of the female member of Fig. 9.
Figure 11:
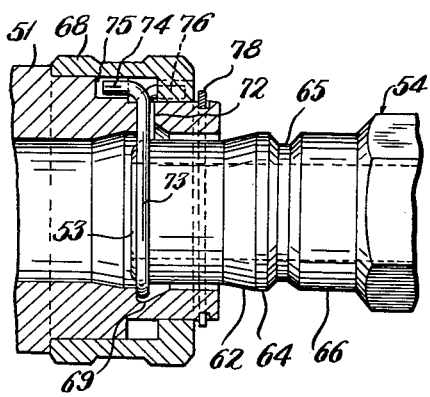
Fig. 11 is a fragmental sectional view showing the locking ring being expanded as the plug is inserted into the female member.
Figure 12:
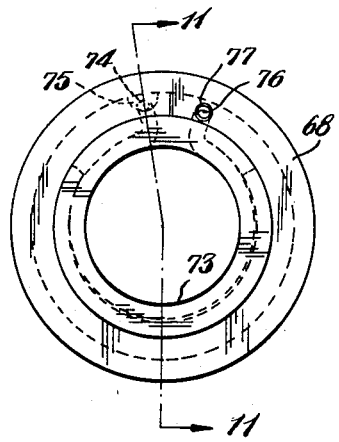
Fig. 12 is an end view of Fig. 11 with the plug omitted.
Figure 13:
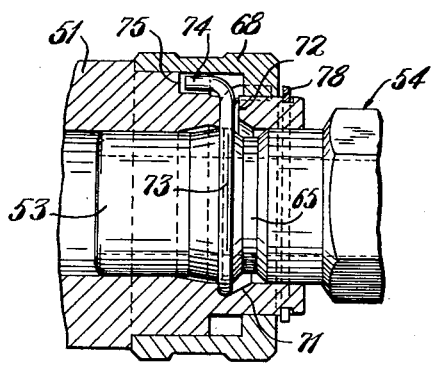
Fig. 13 is a fragmental sectional view showing the parts as the split ring is expanded to its maximum extent while the plug is being inserted.
Figure 14:
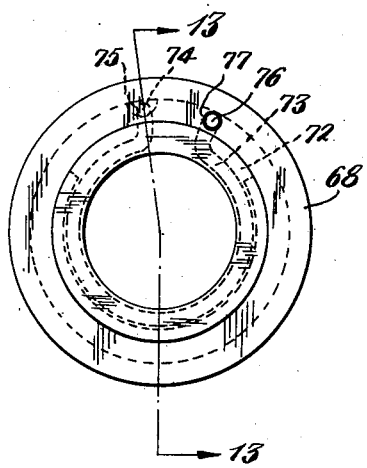
Fig. 14 is an end view of Fig. 13 with the plug omitted.

The effect upon the locking ring as the two coupling members are moved to coupled position is illustrated in Figs. 9, 11, 13 and 7, although it is to be understood that the assembly of the members is the result of a single continuous movement pushing them together. In Figs. 9 and 10 the ring is under no stress and its lower side, as viewed in the drawings, projects part way out of groove 69. This corresponds to position a of Fig. 15. As the plug 54 is pushed into the female member its forward end engages the lower part of the ring, as indicated in Fig. 11, but does not cam it outwardly to any appreciable extent. As the plug is pushed inwardly further however its beveled part 62 cams the lower side of the ring outwardly until it rides up onto the land 64 of the plug as illustrated in Fig. 13, which corresponds to the position b of Fig. 15. During this movement the ring is expanded, that is the anchored end 76 moves around from its position of Fig. 10 to its position of Fig. 14, carrying the sleeve 68 around with it. Throughout these movements the spring 57 is being compressed. As soon as the plug is pushed beyond this point the ring enters the beveled groove 65 of the plug and is free to contract again to the position indicated in Fig. 8. Now when the operator releases his pressure on plug 54 spring 57 exerts a rearward pressure on the plug and the forward beveled wall of groove 65 swings the lower side of ring 73 backwardly about its anchored end 74, causing the ring to ride up on the inclined surface 71 of groove 69 into a wedging position between the two surfaces as illustrated in Fig. 7 and at c in Fig. 15.

Figure 15:
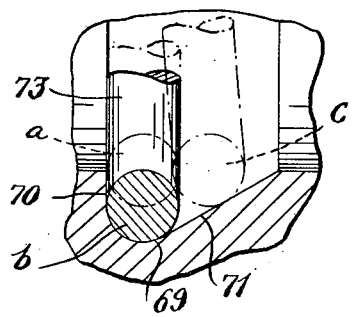
Fig. 15 is a fragmental view on a larger scale showing three different positions of that side of the ring which is diametrically opposed to the anchored end thereof.

When the two members of the coupling are to be disengaged the operator grasps the female member 50, 51 in one hand and turns sleeve 68 with the other hand to expand the ring 73, whereupon the side of the ring opposite its anchored end slides down the inclined surface 71 of groove 69 to the position of Fig. 13 and b of Fig. 15. Spring 57 then snaps the plug 54 outwardly to disengage the coupling.

Having thus described my invention, I claim:

1. In a coupling of the character described, a female member having an open end portion, a male member having a nose adapted to be inserted into the opening of said female member, said female member containing a spring opposing coupling of the male and female members, said male and female members having facing annular grooves adapted to register, said female member having a transverse radial slot therethrough the inner end of which communicates with the groove of that member, a spring ring of non-compressible material carried by said female member, said ring normally engaging the base of the groove in said male member and having radial terminal portions extending through said slot with the radial portions of said ring being pivotally held by the slot against substantial axial movement relative to said female member, the groove in said female member having a depth sufficient to completely receive the spring ring when in an expanded condition, the depth of the groove in said male member being approximately half the cross-sectional diameter of the ring, whereby the ring normally lies in both grooves and locks the coupling members together, said female member being provided with a surface flared outwardly from said open end portion and terminating in the annular groove of that member with the outermost portion of said surface having a diameter at least approximately the outer diameter of the unexpanded ring, the nose of the male member in front of its groove being beveled to expand the ring into the groove of the female member when the coupling members are manually forced together, after which when the manual pressure is relieved said spring swings the ring about its radial terminal portions and forces it into wedging position between said flared surface and the groove in the male member, whereby unintentional expansion of the ring and consequent breaking of the coupling is prevented, and manually operable means for spreading said terminal portions and expanding said ring.

2. A coupling substantially as defined in claim 1 wherein the manually operable means comprises a sleeve rotatably mounted on said female member, one terminal portion of said ring being anchored in said female member, the other terminal portion of said ring being anchored in said sleeve whereby the rotation of said sleeve in one direction will expand said ring and cause the side thereof opposite its anchored end to move along said flared surface and into the groove in said female member whereupon said spring will snap said male member axially outwardly of the female member.

3. A coupling substantially as defined in claim 2 wherein the terminal portions of said ring extend in opposite directions parallel to the axis of the coupling, one terminal portion extending into and anchored in a notch in the female member beneath said sleeve and the other terminal portion extending into a hole in the inner side of said sleeve.

References Cited in the file of this patent

UNITED STATES PATENTS

| | | |
|---|---|---|
| 2,084,431 | Catley | June 22, 1937 |
| 2,138,940 | Robinson | Dec. 6, 1938 |
| 2,253,018 | Cowles | Aug. 19, 1941 |
| 2,433,119 | Hansen | Dec. 23, 1947 |
| 2,478,052 | Palm | Aug. 2, 1949 |